Figure 1:
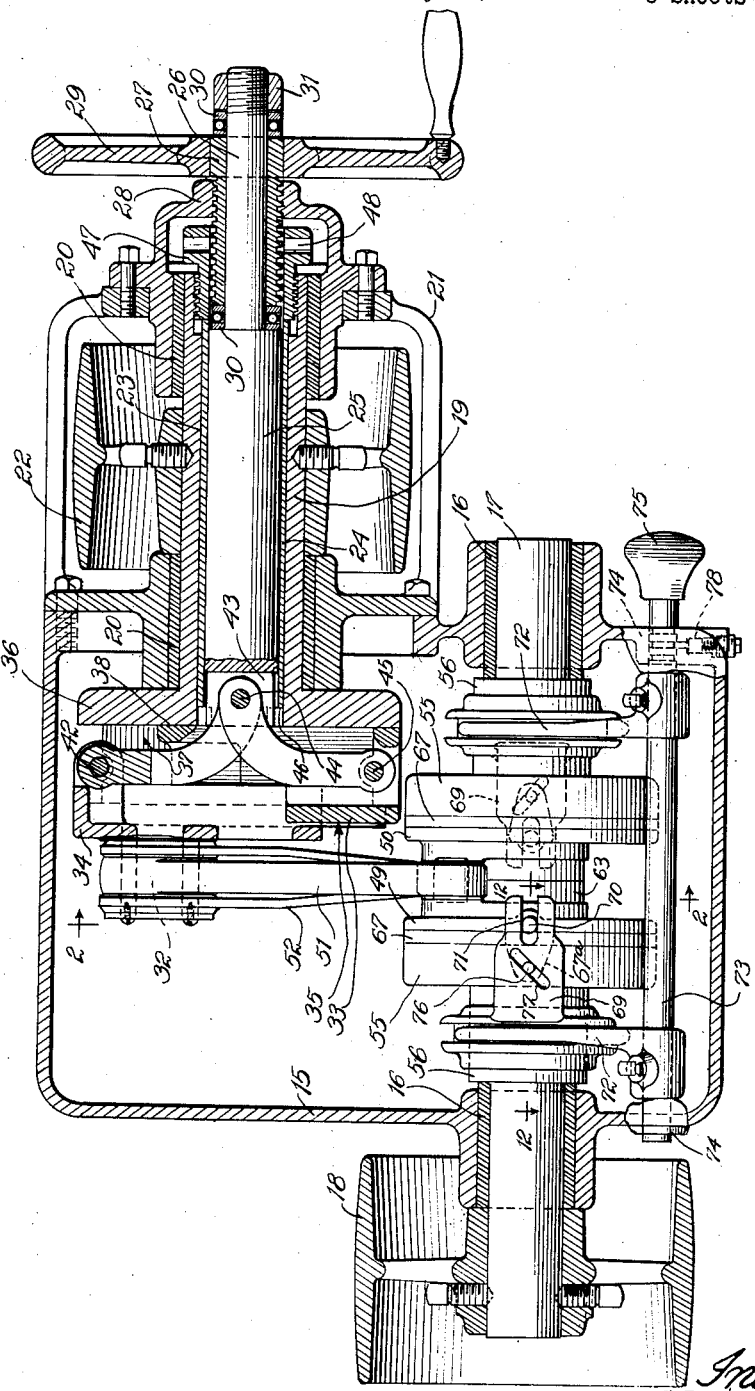

March 2, 1926

J. S. BARNES 1,575,027

VARIABLE SPEED TRANSMISSION MECHANISM

Filed July 31, 1922   3 Sheets-Sheet 1

Witness
John E. Titus

Inventor
John S. Barnes
By Blindahl, Pichu & Carlson
Attys

March 2, 1926.  1,575,027
J. S. BARNES
VARIABLE SPEED TRANSMISSION MECHANISM
Filed July 31, 1922   3 Sheets-Sheet 2
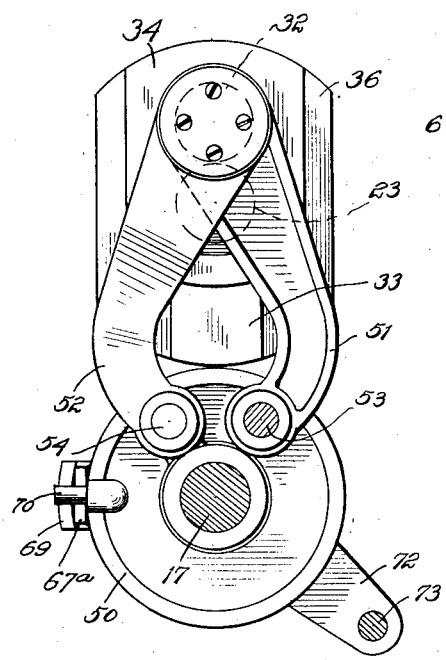
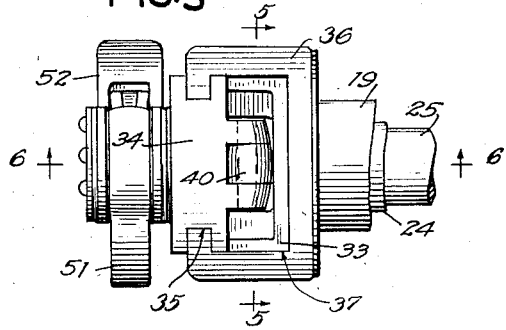
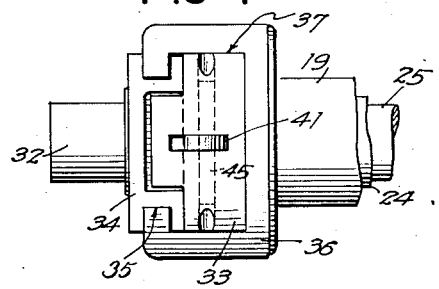
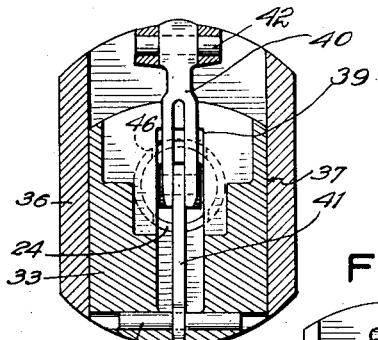
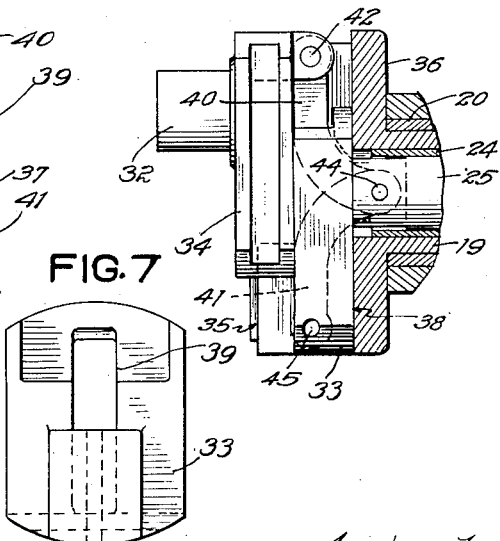

March 2, 1926.
J. S. BARNES
1,575,027
VARIABLE SPEED TRANSMISSION MECHANISM
Filed July 31, 1922   3 Sheets-Sheet 3
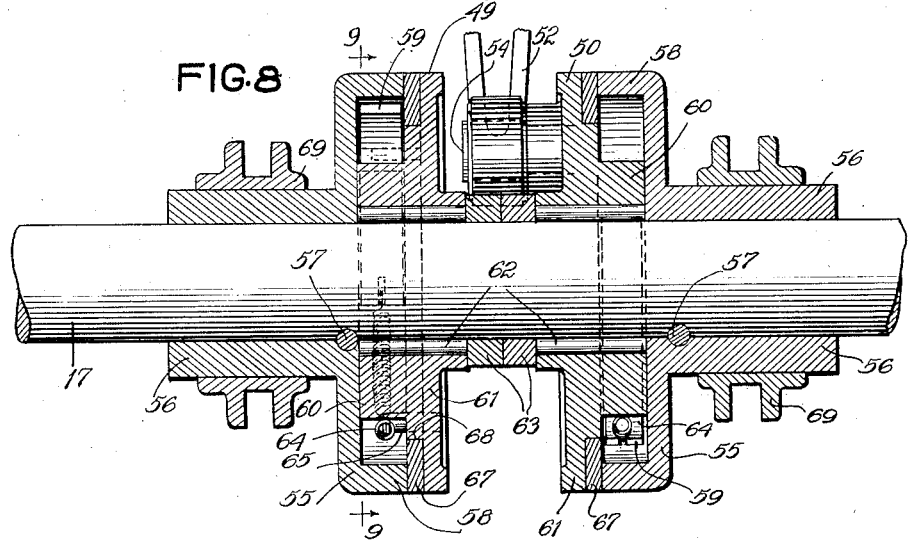
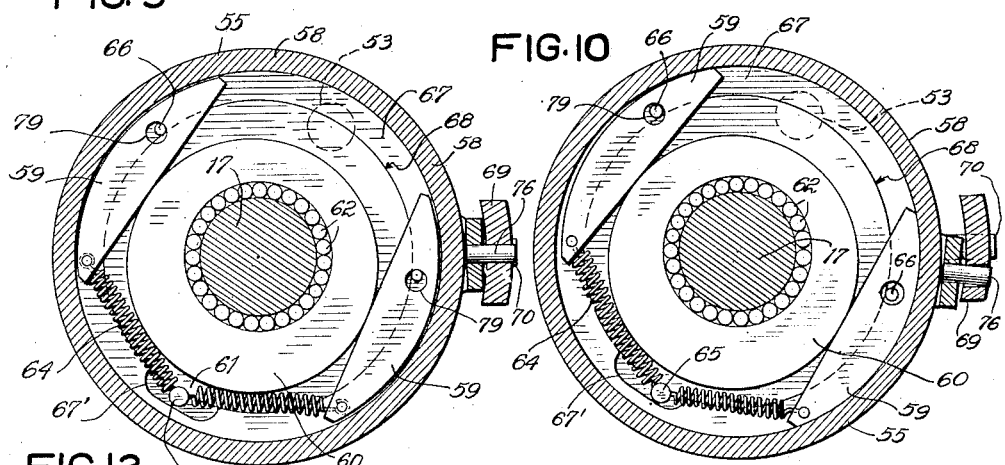
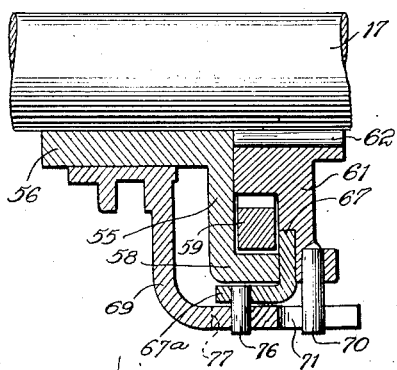
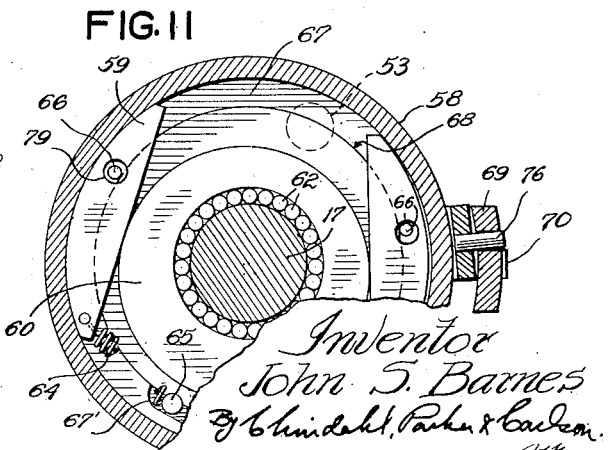
Inventor
John S. Barnes Patented Mar. 2, 1926.

1,575,027

UNITED STATES PATENT OFFICE.

JOHN S. BARNES, OF ROCKFORD, ILLINOIS, ASSIGNOR TO W. F. & JOHN BARNES COMPANY, OF ROCKFORD, ILLINOIS, A CORPORATION OF ILLINOIS.

VARIABLE-SPEED-TRANSMISSION MECHANISM.

Application filed July 31, 1922. Serial No. 578,629.

*To all whom it may concern:*

Be it known that I, JOHN S. BARNES, a citizen of the United States, residing at Rockford, in the county of Winnebago and State of Illinois, have invented a certain new and useful Variable-Speed-Transmission Mechanism, of which the following is a specification.

This invention relates to variable speed transmission mechanism designed especially for use in the transmission of power for the operation of lathes, drill presses, milling machines and the like.

One of the principal objects of the invention is to provide a compact mechanism of this character which may readily be interposed in the driving connections for a machine, and is adapted for easy adjustment to vary within considerable limits the speed at which the machine is driven and also to reverse the direction of driving or to disconnect the machine from driven relation to the driving means at will during the continued operation of the driving means.

Another object of the invention is to provide a mechanism of this character embodying an adjustable crank pin having a counterweight simultaneously adjustable therewith and to the same extent to produce a perfectly balanced structure which will avoid vibration in operation even at high speeds.

A further object of the invention is to provide in connection with the adjustment for the crank pin and its counterweight, means for securing locking the pin and weight simultaneously in adjusted relation.

Still another object of the invention is to provide a manually operable reversing device for the driver interposed between the drive shaft and the driven shaft of the mechanism, whereby in the continued operation of the drive shaft the direction of rotation of the driven shaft may be reversed at will or its operation discontinued.

The invention embraces other objects and advantages to be pointed out more fully in the following detailed description.

In the drawings, Figure 1 is a central longitudinal section through a mechanism embodying the present invention. Fig. 2 is a fragmentary transverse section taken on the line 2—2 of Fig. 1 showing the driving connection for the drivers with the adjustable crank pin. Fig. 3 is a top plan view of some of the parts shown in Fig. 2. Fig. 4 is an underside plan view of some of the parts shown in Fig. 3, the connecting rods being removed from the adjustable crank pin. Fig. 5 is a transverse sectional detail taken on the line 5—5 of Fig. 3. Fig. 6 is a longitudinal sectional detail taken on the line 6—6 of Fig. 3, the adjustable crank pin support and counterweight being shown in elevation. Fig. 7 is an isolated elevational detail of the adjustable counterweight for the adjustable crank pin. Fig. 8 is a fragmentary enlarged longitudinal sectional detail of the drivers on the driven shaft. Fig. 9 is a transverse sectional detail taken on the line 9—9 of Fig. 8. In this view the gripper shoes of the driver are illustrated in neutral position permitting of the free oscillation of the driver with respect to the driven shaft. Figs. 10 and 11 are views similar to Fig. 9 showing the gripper shoes in the two operative positions to which they are capable of movement for driving the driven shaft in reverse directions; and Fig. 12 is a fragmentary enlarged horizontal sectional detail of the manually operable shifter for the gripper shoes, the view being taken on the line 12—12 of Fig. 1.

Throughout the views the same reference numerals apply to corresponding parts.

Referring to the drawings, the mechanism is preferably encased within a main housing 15 arranged to be mounted in any suitable relation to the machine to be driven. The housing provides bearings 16 for a driven shaft 17 which is shown in the drawings as carrying a driven pulley 18 on its inner end. As illustrating one of the purposes to which the present invention may be applied, it may be stated that the driven shaft 17 may be the headstock spindle of a lathe. Disposed conveniently above the driven shaft 17 is the drive shaft 19 operating in bearings 20 in the cage 21 bolted or otherwise suitably secured to the housing 15. The drive shaft 19 has the drive pulley 22 rigidly secured thereon, as shown, to receive a belt running to a shaft or extending to an electric motor or the like stationed conveniently with respect thereto. The cage 21, it will be noted, has openings in its sides to admit a driving belt.

On the inner end of the drive shaft 19 is a head which virtually constitutes a crank disk. Said head carries two slides which are simultaneously adjustable radially toward and away from each other. One of the slides is provided with a crank pin. The other slide constitutes a counterweight. These slides and the means for adjusting and locking them will now be described.

The drive shaft 19 has a central bore 23 wherein is slidable a sleeve 24. The latter receives a longitudinally adjustable rod 25 the outer end of which is reduced as at 26 to turn freely in a longitudinally adjustable sleeve 27. The latter is externally screw-threaded for engagement by the internally screw-threaded neck 28 on the outer bearing 20. An operating hand wheel 29 is rigid with the sleeve 27. A pair of thrust bearings 30 are provided for the ends of the sleeve 27 and are held in assembled relation therewith on the reduced end 26 of the rod 25 by means of a nut 31 threaded onto the outer end of the latter. The bearings 30 assume the thrust arising in the adjustment of the sleeve 27 and render such adjustment easy.

The rod 25 in its movement in and out is arranged to adjust radially toward and away from each other a crank pin 32 and a counterweight 33 and likewise is adapted to serve as a stay for these elements to hold the same in adjusted relation. The crank pin 32 is supported suitably upon a slide 34 adjustable diametrically with respect to the axis of rotation of the shaft 19 in a guideway 35 (Fig. 3) in the head 36 provided on the inner end of the drive shaft 19. The head 36 has another guideway 37 behind the guideway 35 to receive and permit adjustment of the counterweight 33. The latter extends substantially the width of the guideway 37 and presents a flat face 38 to the bore 23 (as shown in Figs. 5 and 6) for a purpose presently to appear. The counterweight 33 is slotted in the back portion thereof as at 39 and has projecting through it the links 40 and 41. The link 40 is pivotally connected to the slide 34 by a pin 42 and is forked at its free end to receive the link 41, both of the links being pivotally connected in the bifurcated inner end 43 of the rod 25 by means of a pin 44. The link 41 similarly has pivotal connection with the counterweight 33 by means of the pin 45. By virtue of the connections for the slide 34 and the counterweight 33 it is apparent that the crank pin 32 and the counterweight 33 are capable of being adjusted simultaneously toward and away from each other by longitudinal movement of the rod 25. The slide 34 with the crank pin 32 thereon and the counterweight 33 are designed to be of approximately the same aggregate weight with the weight of the links, pins and other connections therefor computed. Therefore, by adjusting the crank pin and the counterweight simultaneously and to the same extent I secure smooth and noiseless operation and avoid excessive wear.

The adjustment of the crank pin having been ascertained to be proper after observation of the operation of the machine in connection with which the mechanism is used, the mechanism may be locked in its adjusted relation by means of the sleeve 24. It will be noted that the inner end of the sleeve 24 is notched as shown at 46 to avoid engagement with the links 40 and 41 in certain positions of adjustment which the links assume relative to the sleeve. The sleeve 24 is arranged to be projected inwardly into tight frictional engagement with the face 38 of the counterweight 33 to lock it and the slide 34 in adjusted relation. Such movement is communicated to the sleeve 24 by means of the nut 47 (Fig. 1) fitting over the sleeve 27 and externally threaded to be received in the internally-threaded outer end of the bore 23 of the drive shaft 19. The nut 47 may be adjusted conveniently by inserting a tool through openings in the neck 28 into sockets 48 provided in the nut.

The crank pin 32 has connection with a pair of oscillating drivers 49 and 50 by means of connecting rods 51 and 52. The latter is forked at its inner end to permit the operation therein of the inner end of the connecting rod 51. These rods are pivotally connected at their outer ends to the oscillating drivers 49 and 50 by pins 53 and 54, respectively, (see Fig. 2), so that upon the operation of the crank pin 32 through a complete cycle each of the drivers 49 and 50 will be oscillated through a complete cycle. It is apparent that the amplitude of the arc through which the drivers are oscillated is dependent upon the extent to which the crank pin 32 has been adjusted away from the axis of rotation of the drive shaft 19. Assuming, of course, that the speed of the drive shaft 19 is maintained substantially constant, the speed of the driven shaft 17 may be varied by the radial adjustment of the crank pin 32, as will hereinafter appear.

The drivers 49 and 50 are structurally identical and are oscillated in opposite directions so that when one is moving on the idle stroke of its cycle the other is on its power stroke. They operate together to turn the shaft continuously in either direction. It will suffice to describe in detail only one of the drivers. Each driver operates in connection with a drum 55 having a hub portion 56 (Fig. 8) rigidly secured upon the driven shaft 17 suitably by means of a pin 57 or the like. The annular flange 58 of the drum 55 is concentric with the shaft 17 and arranged to be frictionally engaged alternatively by either of the gripper shoes 59. There are preferably two shoes provided for each driver although, of course, it is conceivable that more may be employed. These shoes are adapted to be projected selectively into engagement with the internal periphery of the flange 58 on either side of the shaft 17 by an eccentric or cam 60 formed preferably integral with a disk 61 forming a part of the driver. The drivers are arranged to oscillate freely with respect to the shaft 17 on anti-friction roller bearings 62 and are held in spaced relation into operative association with the drums 55 by spacing rings 63. The shoes 59 are normally held in close engagement with the periphery of the cam 60 by coiled tension springs 64 operating between the free ends of the shoes 59 and a stud 65 projecting from the disk 61.

The shoes 59 are adapted to be adjusted circumferentially relative to the cam 60 for the purpose of rendering either of the shoes operative to drive the drum or to render both shoes inoperative. Such adjustment thereof is secured by mounting the pins 66, upon which the shoes 59 are held, on a ring 67 arranged for relative rotary movement with respect to the disk 61 on an annular shoulder 68 provided on the disk 61 at the base of the cam 60. The ring 67 has a slot 67' to permit movement thereof relative to the stud 65. Movement of the ring 67 relative to the disk 61 is preferably produced by means of a shifter 69 (Figs. 1 and 12), one of which is provided for each driver, both being arranged for simultaneous manipulation. The shifters 69 are structurally the same and operate similarly but oppositely on respectively opposite sides of the drivers 49 and 50 to shift the rings 67 angularly in the same direction circumferentially. The shifters oscillate with the drivers and despite longitudinal adjustment relative thereto always occupy the same relative positions with respect to the disks 61 by virtue of the connection afforded by the pins 70 operating in the longitudinal slots 71 of the shifters 69. Longitudinal movement relative to the shaft 17 and the disks 61 is communicated to the shifters 69 by means of yokes 72 reciprocable with the shifter rod 73 on opposite ends thereof. The rod 73 extends longitudinally in the casing 15 through bearings 74 and has a hand piece 75 whereby the yokes 72 may be operated together manually during the continued operation of the drive shaft 19. In the longitudinal movement of the shifters 69 each of the rings 67 is arranged to be moved angularly or circumferentially by virtue of the pins 76 (Figs. 1 and 12) operating in the slots 77 extending diagonally relative to the slots 71. The pins 76 are fixed to angular lugs 67* on the rings 67. In the position illustrated in Fig. 1 the pins 76 are midway in the slots 77 and thereby hold the rings 67 in neutral position. The corresponding position of the shoes 59 is shown in Fig. 9. In such position both drivers are capable of oscillation without effecting the driving of the shaft 17. A suitable detent such as that shown at 78 may be provided to hold the rod 73 in the position to which it has been moved manually. This is to prevent accidental movement of the shifters 69. Upon reciprocation of the rod 73 to exterme positions beyond the central or neutral position last referred to, so that the pins 76 occupy positions at extreme ends of the slots 77, the shaft 17 is driven in reverse directions as will presently appear.

In order to secure proper operation of the gripper shoes 59 the same preferably have lost motion connections with the pins 66 by providing enlarged openings 79 in the shoes to receive the pins. These openings appear in Figs. 9 to 11.

The operation of the mechanism will be considered in its different phases: In Fig. 10 the shoes 59 appear as they are when shifted with the ring 67 by pulling the rod 73 out as far as it will go. The gripper shoe at the right is thus made operative to frictionally engage with the inner periphery of the flange 58 of the drum 55 on the up stroke of the connecting rod 51. Remembering that the rings 67 for both drivers are shifted in the same direction, it may be said that so far as the shoes 59, in their relation to the cam and the drum, are concerned, this view (Fig. 10) serves to illustrate how the shoes have been shifted in both of the drivers; each of the drivers has one of its shoes shifted into driving position and both of said shoes, as respects the shaft 17, are on the same side. The propriety of this will appear hereinafter if it is not already apparent from the fact that the drivers oscillate oppositely, that is, when one is swinging clockwise the other is swinging counterclockwise and vice versa. Thus when one is on its driving stroke the other is on its idle stroke and conversely. In the illustration, it is assumed that the crank pin 32 is on upper dead center. As regards the driver 49, shown in the illustration, the shoe 59 thereof is at this time at the upper end of a drive stroke and about to descend on the idle stroke. As regards the driver 50, it has during the power stroke of driver 49 operated through its idle stroke and at the moment is about to move on its power stroke. Due to the connections of the rods 51 and 52 being reversed as regards the drivers, the driver 50 at the moment considered is therefore about to turn in the same direction as the driver 49 did on its power stroke. The effective shoe in both drivers being on the same side of the shaft 17 its driving is effected continuously in the same direction. The shoes coact with the cams 60 and the flange 58 of the drums 55 in the following manner, referring to Fig. 10: On the up stroke of the pin 53 the cam 60 forces the shoe 59 outwardly into frictional engagement with the flange 58. The lost motion afforded for the shoe by its opening 79 permits this movement. The shoe in this position is virtually wedged in between the cam and the flange and serves to transmit power to the drum 55 so long as the cam is moving in one direction. The moment, however, that the cam reverses its movement it moves away from the shoe so that the latter is free to move out of engagement with the flange. This it does under the action of the spring 64. The action is practically instantaneous so that the shoe actually snaps over to its disengaged position at the beginning of the idle stroke and remains there until the commencement of the power or driving stroke.

Fig. 11 illustrates similarly what occurs when the shifter rod 73 is pushed in as far as it will go. In this event the pins 76 occupy positions at the extreme ends of the slots 77. The shoes 59 are thereby shifted oppositely from the position shown in Fig. 10 so that in this case the shoes on the opposite side of the shaft 17 are effective to frictionally engage the internal periphery of the drums to drive in a reverse direction. With this arrangement the driver 49 moves on its drive stroke on the down stroke of the rod 51 and the driver 50 on the up stroke of the rod 52. In all other respects the operation as described with reference to Fig. 10 applies to this figure also. As hereinbefore explained, while one of the drivers 49 and 50 is making a working stroke, the other driver is making an idle stroke.

From the foregoing description it will appear that I have provided a unique form of variable speed transmission mechanism, the construction of which permits of ease in adjustments within comparatively wide limits of the speed of the driven shaft, at the same time avoiding the unbalanced arrangement and consequent vibration and resulting excessive wear attributable to the adjustment of the crank pin and its support to extreme positions relative to the drive shaft, the mechanism further being adapted to be locked securely in its adjusted relation. A further advantage of the mechanism of the present invention apparent from the foregoing description resides in the fact that it permits the operator to utilize the mechanism as a clutch to disconnect the power drive from the machine, and dispenses with the necessity for providing complicated forms of transmission or back gearing for the machine to permit changing the speed thereof or reversing its operation. Furthermore, the mechanism affords reversibility of the operation of the machine during the continued operation of the drive shaft in one direction.

From the foregoing description it will be apparent that the invention is capable of certain modifications and adaptations without departing from the spirit of the invention. The appended claims are therefore intended to include such modifications and adaptations of the invention as would occur to one skilled in the art to which the invention relates.

I claim as my invention:

1. In a variable speed transmission mechanism, the combination with a driving element of a bearing block adjustable toward and away from the rotational axis of said element, a counterweight slidably mounted on said element in diametrically opposed relation to said block, a toggle mechanism including a pair of links respectively connected to said block and counterweight, and means for actuating said toggle mechanism to effect concurrent movement of said block and counterweight toward and away from each other.

2. In a variable speed transmission mechanism, the combination with a drive shaft having a central bore of a rod axially movable in said bore, a pair of slides mounted on said shaft in diametrically opposed relation, each of said slides being movable transversely to the axis of said shaft, an operative connection between each of said slides and said rod, and means for actuating said rod to simultaneously adjust said slides relative to said axis.

3. In a variable speed transmission mechanism, the combination with a shaft of a pair of slides arranged on said shaft in diametrically opposed relation, said slides being movable toward and away from the axis of said shaft, a member carried by said shaft, a pair of toggle links each having a connection with one of said slides and with said member, and means for adjusting said member axially whereby to adjust said slides transversely relative to said axis.

4. In a variable speed transmission mechanism, the combination with a drive shaft, of a diametrical guideway in one end of said shaft, a crank pin bearing support slidable in said guideway, a second diametrical guideway behind said support, a counterweight slidable in said second guideway, a pair of toggle links connected at one of their ends to said support and counterweight respectively, an axially movable member on said shaft connected to each of said links, and means for adjusting said member longitudinally to adjust said support and counterweight radially.

5. In a variable speed transmision mechanism, the combination with a shaft having a central bore of a rod in said bore, a bearing support and counterweight arranged on said shaft for diametrical movement in opposite directions, a link connecting said rod with said support, a link connecting said rod with said counterweight, and means for adjusting said rod axially to adjust said support and counterweight radially relative to said bore.

6. In a variable speed transmission mechanism, the combination with a driving element having a central bore of a sleeve longitudinally movable in said bore, a rod longitudinally movable in said sleeve, a crank pin bearing support and a counterweight, each arranged for movement toward and away from the rotational axis of said element, means for adjusting said rod to adjust said support and counterweight, and means for moving said sleeve toward said support to lock the latter in adjusted position.

7. In a variable speed transmission mechanism, the combination with a hollow driving element of an axially movable sleeve in said element, a crank pin bearing support and a counterweight disposed in diametrically opposed relation on said shaft, means providing simultaneous radial adjustment for said support and counterweight, and means for moving said sleeve longitudinally into engagement with said counterweight to lock said support in adjusted position.

8. In a variable speed transmission mechanism, the combination with a drive shaft having a central bore of a crank pin support disposed on one end of said shaft for movement toward and away from the axis of said bore, a counterweight disposed behind said support and adapted to move parallel with but opposite to said support, means for effecting simultaneous movement of said support and counterweight, a sleeve axially movable in said bore, and means operable to press the end of said sleeve against said counterweight to hold said support in adjusted position.

In testimony whereof, I have hereunto affixed my signature.

JOHN S. BARNES.